United States Patent
Ahrens et al.

(10) Patent No.: US 12,429,932 B2
(45) Date of Patent: Sep. 30, 2025

(54) LID CARVEOUTS FOR PROCESSOR LIGHTING

(71) Applicant: Advanced Micro Devices, Inc., Santa Clara, CA (US)

(72) Inventors: Jerry Anton Ahrens, Sister Bay, WI (US); William Robert Alverson, Del Valle, TX (US); Amitabh Mehra, Fort Collins, CO (US); Grant Evan Ley, Eden, UT (US); Anil Harwani, Austin, TX (US); Joshua Taylor Knight, Georgetown, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 568 days.

(21) Appl. No.: 17/704,862

(22) Filed: Mar. 25, 2022

(65) Prior Publication Data

US 2023/0324967 A1 Oct. 12, 2023

(51) Int. Cl.
*G06F 1/20* (2006.01)
(52) U.S. Cl.
CPC .................... *G06F 1/206* (2013.01)
(58) Field of Classification Search
CPC ............ G06F 1/206; G06F 1/203; G06F 1/26
See application file for complete search history.

(56) References Cited

U.S. PATENT DOCUMENTS

| 4,541,035 A | 9/1985 | Carlson et al. |
| 5,886,870 A | 3/1999 | Omori |
| 6,219,241 B1 | 4/2001 | Jones |
| 6,252,774 B1 | 6/2001 | Rife et al. |
| 6,728,103 B1 | 4/2004 | Smedberg |
| 7,120,027 B2 | 10/2006 | Yatskov et al. |
| 7,432,591 B1 | 10/2008 | Yamada et al. |
| 7,469,355 B1 | 12/2008 | Chong |

(Continued)

FOREIGN PATENT DOCUMENTS

| CN | 2665787 Y | 12/2004 |
| CN | 208673319 U | 3/2019 |
| WO | 2023211606 A1 | 11/2023 |

OTHER PUBLICATIONS

U.S. Appl. No. 17/708,453, "Final Office Action", U.S. Appl. No. 17/708,453, filed Jul. 20, 2023, 12 pages.

(Continued)

*Primary Examiner* — Richard A Booth
(74) *Attorney, Agent, or Firm* — FIG. 1 Patents

(57) ABSTRACT

Package lids with carveouts configured to expose lights directly connected to an internal component of a processor are described. Lid carveouts are configured to precisely align and mechanically secure a cooling device to the package lid by receiving protrusions of the cooling device via a press fit connection, while maintaining visibility of lights directly connected to processor internal components when the cooling device is connected. Lid carveouts are further configured to expose one or more connectors disposed on a processor surface that supports its internal component. When contacted by corresponding connectors of an auxiliary device, such as a light not integrated into a processor package or a cooling device, the lid carveouts enable direct connections between the package's internal components and the auxiliary device.

20 Claims, 9 Drawing Sheets

(56) References Cited

U.S. PATENT DOCUMENTS

| | | | |
|---|---|---|---|
| 7,500,122 | B2 | 3/2009 | Won et al. |
| 9,818,670 | B2 | 11/2017 | Macall et al. |
| 11,262,924 | B2 | 3/2022 | Alverson et al. |
| 11,373,929 | B1 * | 6/2022 | Refai-Ahmed ....... H01L 23/473 |
| 11,609,596 | B2 | 3/2023 | Sin et al. |
| 12,038,779 | B2 | 7/2024 | Mehra et al. |
| 12,253,892 | B2 | 3/2025 | Ahrens et al. |
| 2003/0065915 | A1 | 4/2003 | Yu et al. |
| 2003/0097602 | A1 | 5/2003 | Bigbee et al. |
| 2004/0036137 | A1 | 2/2004 | Gleason et al. |
| 2004/0042177 | A1 | 3/2004 | Geva et al. |
| 2006/0149975 | A1 | 7/2006 | Rotem et al. |
| 2007/0106428 | A1 | 5/2007 | Omizo et al. |
| 2008/0014780 | A1 | 1/2008 | Lin |
| 2008/0114973 | A1 | 5/2008 | Norton et al. |
| 2008/0230893 | A1 | 9/2008 | Too et al. |
| 2008/0276026 | A1 | 11/2008 | Branover et al. |
| 2010/0085712 | A1 | 4/2010 | Hrehor, Jr. et al. |
| 2011/0040902 | A1 | 2/2011 | Housty |
| 2011/0231637 | A1 | 9/2011 | Schuette |
| 2014/0095904 | A1 | 4/2014 | Ananthakrishnan et al. |
| 2017/0105278 | A1 * | 4/2017 | Cooper .................. H05K 1/111 |
| 2017/0262354 | A1 | 9/2017 | Han |
| 2019/0079806 | A1 | 3/2019 | Ragland et al. |
| 2020/0019462 | A1 | 1/2020 | Prather et al. |
| 2020/0049157 | A1 | 2/2020 | Richter |
| 2020/0192420 | A1 | 6/2020 | Irshad et al. |
| 2020/0364041 | A1 | 11/2020 | Bulusu et al. |
| 2021/0068302 | A1 | 3/2021 | North et al. |
| 2023/0315171 | A1 | 10/2023 | Ahrens et al. |
| 2023/0315191 | A1 | 10/2023 | Alverson et al. |
| 2023/0350591 | A1 | 11/2023 | Ley et al. |
| 2023/0350696 | A1 | 11/2023 | Harwani et al. |
| 2025/0216888 | A1 | 7/2025 | Rodrigue et al. |

OTHER PUBLICATIONS

U.S. Appl. No. 17/708,453 , "Non-Final Office Action", U.S. Appl. No. 17/708,453, filed Mar. 14, 2023, 11 pages.

U.S. Appl. No. 17/708,453 , "Non-Final Office Action", U.S. Appl. No. 17/708,453, filed Sep. 8, 2023, 13 pages.

U.S. Appl. No. 17/732,718 , "Non-Final Office Action", U.S. Appl. No. 17/732,718, filed Sep. 14, 2023, 17 pages.

PCT/US2023/062509 , "International Search Report and Written Opinion", PCT Application No. PCT/US2023/062509, May 26, 2023, 10 pages.

PCT/US2023/014176 , "International Search Report and Written Opinion", PCT Application No. PCT/US2023/014176, Jun. 12, 2023, 8 pages.

Rodrigue, Wayne Paul, et al., "Pursuant to MPEP § 2001.06(b) the applicant brings the following co-pending application to the Examiner's attention:", U.S. Appl. No. 18/399,052, filed Dec. 28, 2023, 52 pages.

U.S. Appl. No. 17/704,912 , "Non-Final Office Action", U.S. Appl. No. 17/704,912, filed Jul. 30, 2024, 12 pages.

U.S. Appl. No. 17/704,912 , "Restriction Requirement", U.S. Appl. No. 17/704,912, filed May 22, 2024, 7 pages.

U.S. Appl. No. 17/704,912 , "Notice of Allowance", U.S. Appl. No. 17/704,912, filed Nov. 20, 2024, 7 pages.

23775445.2 , "Foreign Office Action", EP Application No. 23775445.2, Nov. 4, 2024, 3 pages.

23775781.0 , "Foreign Office Action", EP Application No. 23775781.0, Nov. 4, 2024, 3 pages.

"Supplemental Notice of Allowability", U.S. Appl. No. 17/704,912, filed Feb. 5, 2025, 2 pages.

Cutress, Ian , "Intel Launches Xeon-W CPUs for Workstations: Skylake-SP & ECC for LGA2066", AnandTech [Online][retrieved Oct. 11, 2023]. Retrieved from the Internet < https://www.anandtech.com/show/11775/intel-launches-xeon-w-cpus-for-workstations>, Aug. 29, 2017, 8 pages.

PCT/US2023/063347 , "International Search Report and Written Opinion", PCT Application No. PCT/US2023/063347, Jun. 13, 2023, 8 pages.

"Non-Final Office Action", U.S. Appl. No. 18/399,052, filed Jun. 4, 2025, 15 pages.

* cited by examiner

LID CARVEOUTS FOR PROCESSOR LIGHTING

BACKGROUND

Computer processors are often manufactured to include an integrated heat spreader, commonly referred to as the processor's "lid." The lid is typically configured as a housing that serves as a protective shell for processor components (e.g., die). In many implementations, the lid is fabricated from metal such as plated copper to provide a pathway for heat transfer away from the processor components to a lid surface connected heatsink or processor cooling device.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
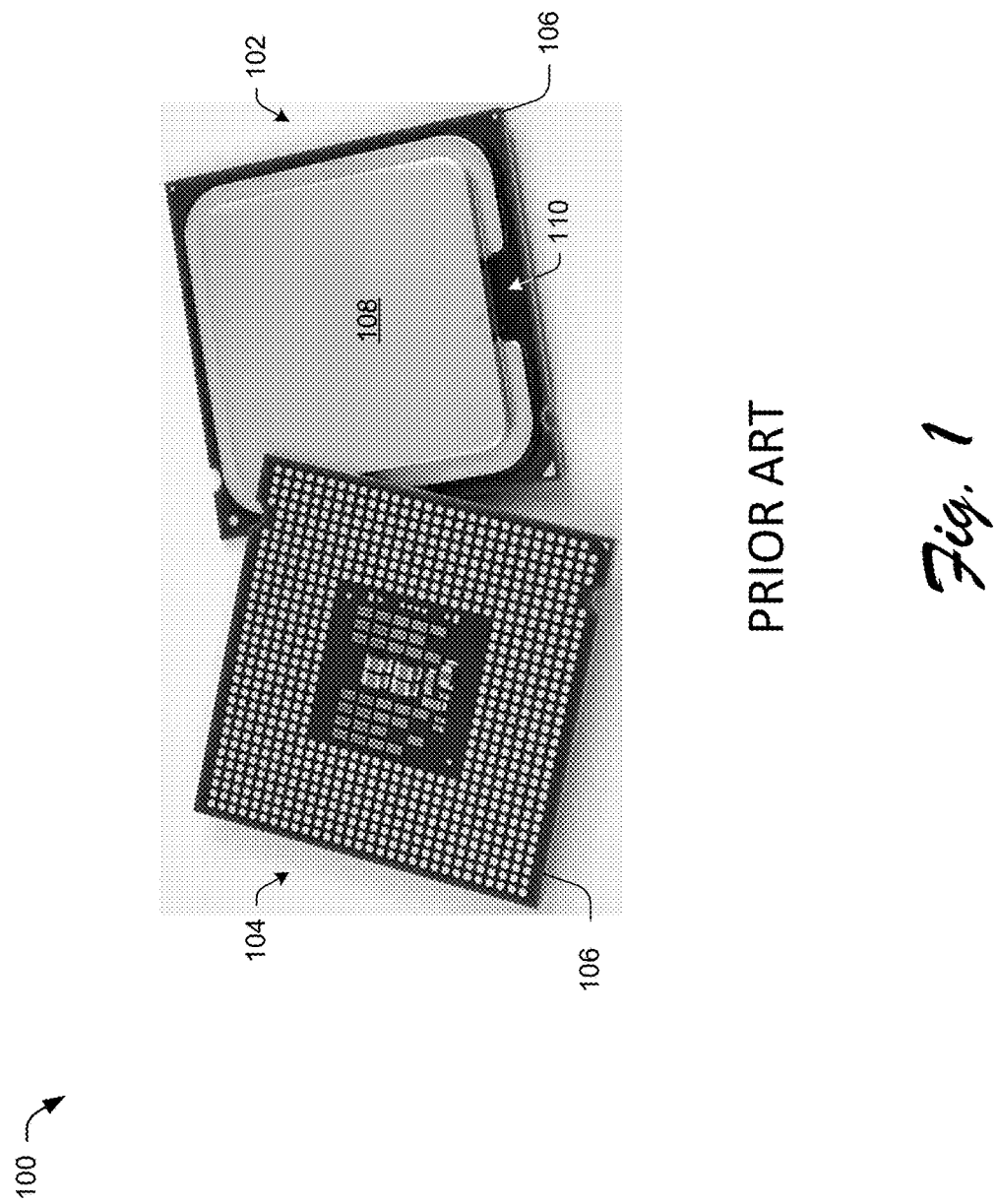
FIG. 1 illustrates an example implementation of a processor configured with a conventional lid.

Processors, integrated circuits, and other semiconductor devices are packaged in a manner that protects internal components (e.g., die) from potentially damaging influences such as contaminants, water damage, light exposure, and so forth. A processor package additionally connects the internal components to an external environment such as a printed circuit board (PCB). In some implementations, processors are packaged with an integrated heat spreader, or "lid," configured as a housing that also serves as a pathway for transferring heat away from the internal components.

For instance, processor lids are often configured with a first surface that contacts the internal components and a second surface opposite the first surface that is configured to contact a cooling device, such as a heatsink, a watercooler block, or the like. Conventional approaches for interfacing a processor lid with a cooling device often rely on a press-fit with thermal compound securing the processor lid to a heat transfer surface of the cooling device. To increase heat transfer away from the die, the lid is designed to have a large surface area that spans virtually an entirety of the processing device when observed from above, such that the lid covers all die included on the processing device substrate. Conventional heatsinks or other cooling devices are designed to cover an entirety of these conventional lids with a cooling interface having similar dimensions in an effort to maximize heat transfer between the thermal heat spreader and the cooling device. Consequently, conventional techniques for securing cooling devices to processor package lids either rely on thermal adhesive compounds that ooze over the edges of a package lid or mechanical attachment points of an external environment on which the package is disposed, such as attachment points positioned on a PCB beyond an external perimeter of the package, or a perimeter of a socket used to secure the package to the PCB.

However, there are a number of drawbacks to such conventional techniques for securing a cooling device to a package lid. One such drawback is the physical footprint required to accommodate such cooling device mechanical attachment points, which constrains the PCB to be larger than desired for many applications. Another drawback is that the cooling device visually occludes the processor device when a user is viewing the PCB. Due to this visual occlusion, a user is unable to directly observe the processor device and is forced to rely on other information sources to ascertain a state of the processor device. One example of another information source is a Basic Input/Output System (BIOS) of the PCB on which the processor device is disposed. For instance, BIOS beep codes are conventionally used to inform computing device users as to various problems with the computing device. BIOS beep codes are configured to notify a user of various problems, such as that a card (e.g., video card, graphics card, etc.) is not found or improperly connected, that a power rail isn't working, that memory can't be found, and so forth. These beep codes provide an audible indication of a detected problem, and are particularly useful in scenarios where the computing device cannot boot for further inspection.

The BIOS, however, only has a limited degree of visibility into internal components of a processing device, such as a central processing unit (CPU) and often requires the CPU be functioning to perform BIOS issue detection and error reporting. Conversely, the CPU is aware of its own current status and has visibility regarding a status of computing device components that the BIOS is unable to detect. For instance, in implementations where the BIOS is corrupt, the BIOS is unable to output the beep codes and consequently unable to inform a computing device user of the BIOS corruption, rendering the user uninformed as to what problems might be preventing normal computing device operation. As an additional example, system BIOS is unable to detect whether Dual In-Line Memory Modules (DIMMS) are plugged into correct sockets, while a CPU is able to detect such a scenario. As further examples, connections between the CPU and components of the PCB on which the CPU is installed that are loose or otherwise improper go undetected by a system BIOS. For instance, system BIOS is unable to determine whether peripheral component interconnect express (PCIe) devices are improperly connected or incompatible with the CPU. As yet another example, when BIOS code is incompatible with a CPU version, the CPU is able to discern such incompatibility that is otherwise undetected by the BIOS. As another example, system BIOS is unable to detect and report fail conditions during a prior boot that are otherwise detectable and reportable by a CPU (e.g., internal CPU error, hang, condition causing a hard lock, and so forth). As yet another shortcoming of these conventional approaches for informing computing device users as to detected problems, system BIOS beep codes are inaccessible for users that are hard of hearing.

To address these conventional shortcomings, package lids with carveouts configured to expose lights directly connected to an internal processor component are described. As described herein, a carveout refers to a portion of an edge of a package lid that recedes from an outer perimeter of the lid. When observed from a top view, each carveout appears as an indentation of an edge of the package lid, such that a portion of the lid edge at the carveout is positioned closer to a center of the package lid than a portion of the lid edge that does not include a carveout. In some implementations, lid carveouts are configured to precisely align and mechanically secure a cooling device to the package lid by receiving protrusions of the cooling device via a press fit connection, while maintaining visibility of processor lights when the cooling device is connected. As an example, some lid carveouts are dimensioned differently from other lid carveouts, such that a cooling device with protrusions similarly dimensioned is mechanically attachable with the lid in only one orientation.

In some implementations, in addition to exposing processor lights, the lid carveouts are configured to expose one or more connectors (e.g., surface mount empty pads configured for electrical connection) disposed on the package. The connectors are configured to establish an electrical connection between the package's internal components and one or more auxiliary components, such as a light not integrated into the package substrate or a cooling device connected to the package lid. By creating a direct connection between the CPU and an auxiliary component, the lid carveouts enable a high-speed connection configured to pass information directly between CPU control circuitry and the auxiliary component (e.g., a light), enabling direct notification of conditions detected by the CPU, from the CPU. While some conventional workarounds incorporate light emitting diodes (LEDs) into the PCB and rely on additional components (e.g., system BIOS, thermocouples monitoring CPU temperatures, etc.) wired to the LEDs to visually convey occurrence of conditions detected by these additional components. However, these conventional workarounds require low-speed communication pathways and passthroughs connecting the CPU to the LEDs.

In contrast to such conventional workarounds, the high-speed connection availed by package lid carveouts advantageously avoids low-speed communication pathways and passthroughs implemented by conventional processor architectures, which fail to indicate CPU-detected conditions in the event of component failure, corruption, disconnection, and so forth. Further, in contrast to conventional solutions that occupy an increased footprint of the PCB to support external LEDs and additional components connecting the CPU to the external LEDs, the package lid carveouts described herein enable an internal processor component to visually communicate information within the constraints of the package footprint. As another benefit, the package lid carveouts described herein expose lights that are useable during debugging or while a processor is under load to visually indicate current processor conditions, which is not availed by conventional package designs.

In some examples, the techniques described herein relate to a processing device including: a substrate including at least one processor core and one or more lights connected via an electrical connection to the at least one processor core; and an integrated heat spreader that is bonded to the substrate and covers the at least one processor core, the integrated heat spreader including a plurality of carveouts that expose at least one of the one or more lights, each of the plurality of carveouts being disposed along an edge of the integrated heat spreader and receding from an outer perimeter of the integrated heat spreader.

In some examples, the techniques described herein relate to a processing device, wherein the at least one processor core includes one or more of a central processing unit, a graphics processing unit, or a parallel accelerated processor.

In some examples, the techniques described herein relate to a processing device, wherein the at least one processor core includes a system management component configured to manage power consumption by the at least one processor core and output a visual indication regarding the power consumption via the one or more lights.

In some examples, the techniques described herein relate to a processing device, wherein the at least one processor core includes a system management component configured to monitor a temperature of the at least one processor core and output a visual indication regarding the temperature via the one or more lights.

In some examples, the techniques described herein relate to a processing device, wherein the at least one processor core includes a system management component configured to monitor whether one or more memory modules are properly connected to the at least one processor core and output a visual indication regarding whether the one or more memory modules are properly connected via the one or more lights.

In some examples, the techniques described herein relate to a processing device, wherein the at least one processor core includes a system management component configured to determine a compatibility of a peripheral component interconnect express device connected to the processing device and output a visual indication regarding the compatibility via the one or more lights.

In some examples, the techniques described herein relate to a processing device, wherein the at least one processor core includes a plurality of processor cores and the one or more lights includes a plurality of lights that each correspond to one of the plurality of processor cores, wherein at least one of the plurality of processor cores includes a system management component configured to visually indicate a status of the plurality of processor cores using the plurality of lights during operation of the processing device.

In some examples, the techniques described herein relate to a processing device, wherein the plurality of carveouts are configured to enable a press fit connection between a cooling device and the integrated heat spreader and maintain visibility of the one or more lights when the cooling device is connected to the integrated heat spreader.

In some examples, the techniques described herein relate to a processing device, wherein the integrated heat spreader includes a first surface configured to contact the at least one processor core and a second surface that is disposed opposite the first surface and configured for transferring heat away from the at least one processor core by contacting a cooling device.

In some examples, the techniques described herein relate to a processing device, wherein at least one of the plurality of carveouts includes an additional surface oriented approximately perpendicular to the first surface and the second surface, the additional surface being configured to mechanically align the integrated heat spreader with a protrusion of a cooling device and transfer heat to the protrusion of the cooling device.

In some examples, the techniques described herein relate to a processing device, wherein the at least one processor core is configured to detect upcoming execution of an operation and, prior to execution of the operation, visually indicate upcoming execution of the operation via the one or more lights.

In some examples, the techniques described herein relate to a method including: determining, by a processor, occurrence of a condition at the processor; and outputting, by the processor, a light code indicating occurrence of the condition via one or more lights connected to an internal component of the processor and visibly exposed by at least one carveout of a lid that is attached to a substrate supporting the internal component of the processor and covers the internal component of the processor.

In some examples, the techniques described herein relate to a method, wherein the at least one carveout is disposed along an edge of the lid and recedes from an outer perimeter of the lid.

In some examples, the techniques described herein relate to a method, wherein the condition includes the internal component of the processor satisfying a temperature threshold.

In some examples, the techniques described herein relate to a method, wherein the condition includes the processor satisfying a power consumption threshold.

In some examples, the techniques described herein relate to a method, wherein the condition includes an improper connection between the processor and one or more memory modules.

In some examples, the techniques described herein relate to a method, wherein the condition includes a connection to an incompatible device connected to the processor via a peripheral component interconnect express connection.

In some examples, the techniques described herein relate to a system including: a processing device including: a substrate with at least one processor core and one or more contacts; an integrated heat spreader that is bonded to the substrate and covers the at least one processor core, the integrated heat spreader including a plurality of carveouts that expose the one or more contacts; and a light connected to the one or more contacts and disposed within one of the plurality of carveouts; and a cooling device including a plurality of protrusions that mechanically align the cooling device with the processing device using a subset of the plurality of carveouts.

In some examples, the techniques described herein relate to a system, wherein the subset of the plurality of carveouts excludes the one of the plurality of carveouts in which the light is disposed.

In some examples, the techniques described herein relate to a system, wherein the system is disposed in a computing device and an output of the light is visible to a human eye observing the computing device.

FIG. 1 illustrates an example implementation of a processor 100 configured with a conventional lid. The illustrated example depicts a top portion 102 and a bottom portion 104 of the processor 100. The bottom portion 104 includes a plurality of pins disposed on a substrate 106 (e.g., silicon) for the processor. The plurality of pins included on the bottom portion 104 are configured to be contacted by corresponding pins of a processor socket adhered to an external environment, such as a computing device motherboard. In conventional processor designs, the plurality of pins included on the bottom portion 104 are the exclusive means by which the processor communicates with the external environment, such that processor inputs and outputs are routed through the processor socket to other components of the external environment (e.g., other PCB components).

The top portion 102 includes a lid 108 disposed on the substrate 106 opposite a side of the substrate 106 including the plurality pins. The lid 108 is configured as an integrated heat spreader that protects internal components (e.g., die) of the processor 100 from overheating by dissipating heat generated by the internal components across a surface area of the lid 108. The flat large flat surface of the lid 108 is conventionally configured as a plated copper plate and configured to contact a corresponding heat transfer surface of a cooling device such as a heatsink, a liquid cooling plate, and so forth.

In many conventional processors, the lid 108 is secured to the substrate 106 using an adhesive (e.g., an epoxy compound) that bonds the lid 108 to the substrate 106. Some conventional processors include a gap 110 that allows venting of heat and trace gasses and avoids harmful pressure buildup while the adhesive cures. However, in contrast to the processor lids described herein, the gap 110 included in conventional processors is not configured for exposing a light of the processor or otherwise availing a connection between a light an internal component of the processor.

Figure 2:
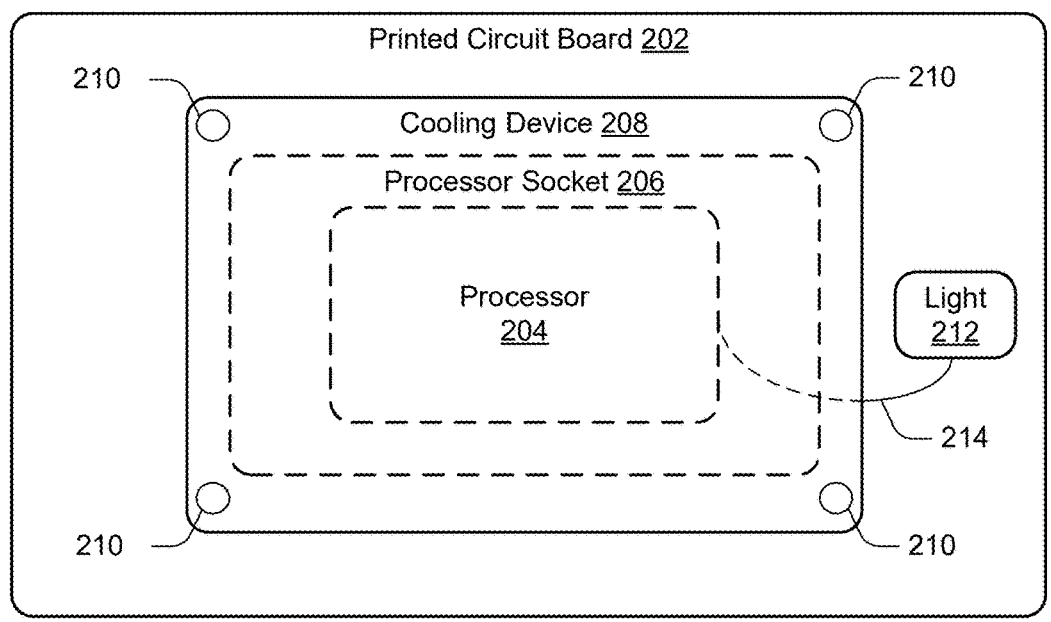
FIG. 2 illustrates an example implementation of a printed circuit board that includes a processor and a cooling device in accordance with one or more conventional implementations.

FIG. 2 illustrates an example 200 of a printed circuit board 202 that includes a processor 204 connected to the printed circuit board 202 via a processor socket 206 and a cooling device 208 in accordance with one or more conventional implementations. Specifically, the illustrated example 200 depicts a top view of the printed circuit board 202. The processor 204 is depicted as being disposed within the processor socket 206, which necessarily occupies a larger footprint of the printed circuit board 202 relative to a footprint of the processor 204 to receive and retain the processor 204. Various conventional methods mechanically couple the cooling device 208 with the processor 204 in a manner that enables heat transfer. For instance, thermal tape or thermal epoxy are conventional solutions that provide an adhesive bond between the processor 204 and the cooling device 208. However, thermal tape and thermal epoxy often spill over an exterior perimeter of the processor 204 when the cooling device 208 is connected via a press fit connection. Due to this spill over, conventional processors are prohibited from including integrated lights disposed along their exterior perimeters, as such integrated lights would be visually occluded by the thermal tape or epoxy.

As an alternative, some conventional methods for attaching the cooling device 208 to the processor 204 rely on mechanical attachment points that couple the cooling device 208 directly to the printed circuit board 202, such as attachment points 210. In implementations, attachment points 210 are configured as holes or anchor points in the printed circuit board 202 configured to retain clips, threaded fasteners, push pins, and so forth that secure the cooling device 208 to the printed circuit board 202. While conventional approaches that leverage attachment points 210 provide more reliable alignment between the cooling device 208 and the processor 204 relative to adhesive-only solutions such as thermal tape or thermal epoxy, the resulting footprint requires a keep-out area that prevents other printed circuit board 202 components from being disposed within an area encompassed by the cooling device 208 and visually occludes the processor 204 when viewing the printed circuit board 202.

For instance, the illustrated example 200 depicts a keep-out area where a footprint of the cooling device 208 encompasses footprints of both the processor socket 206 and the processor 204, preventing other components of the printed circuit board 202 from being positioned in an area having corners defined by the attachment points 210. The illustrated example 200 further depicts a conventional connection between the processor 204 and a light 212 installed on the printed circuit board 202 at a location other than the location used for installing the processor 204. In the illustrated example, the light 212 is connected to the processor 204 via wire 214.

The wire 214 is representative of a low-speed signaling interface that routes communications through multiple low-speed busses and logic components (e.g., microcontrollers) rather than directly interfacing the light 212 with the processor 204. These low-speed conventional communication pathways between the processor 204 and light 212 render the processor 204 unable to visually indicate detected conditions in the event of disconnection, corruption, or failure of busses, component, and the like included in the signaling interface represented by wire 214. Consequently, conventional processor package design requires a prohibitively large footprint to accommodate connected lights and suffers from inefficient communications between connected lights and internal components of the processor.

Figure 3:
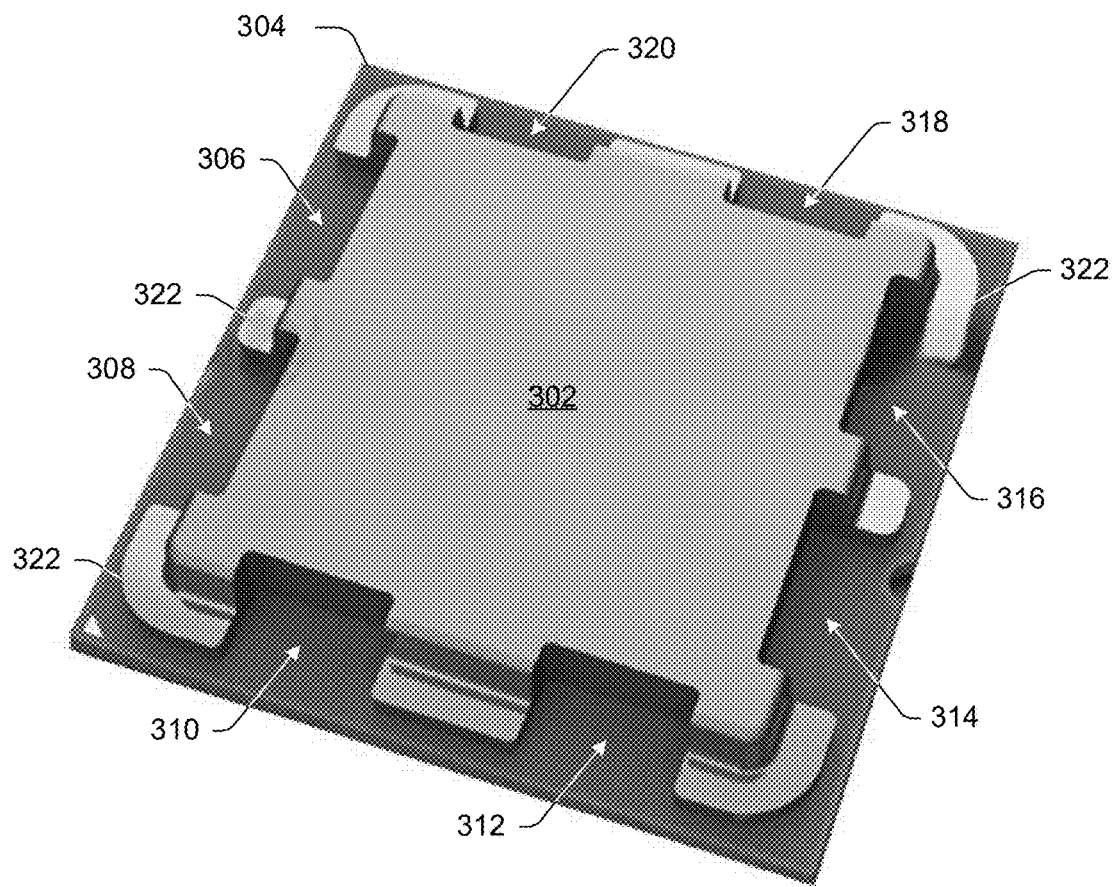
FIG. 3 illustrates an example of a processor with a lid including carveouts for processor lighting.

FIG. 3 illustrates an example of a processor 300 with a lid including carveouts for connection with and visual exposure of one or more lights coupled to the processor 300. In the illustrated example, the processor 300 includes a lid 302. The lid 302 is configured as an integrated heat spreader for the processor 300, which is bonded to a substrate 304 that includes at least one internal component of the processor 300. In some implementations, the substrate 304 is configured as silicon that includes at least one processor core implemented in a die disposed on a surface of the substrate 304 to which the lid 302 is bonded. The at least one processor core is representative of a CPU, a GPU, a parallel accelerated processor, a plurality of microprocessors, a digital signal processor (DSP), one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine, or combinations thereof.

The lid 302 is further depicted as including a plurality of carveouts disposed along an edge of the lid 302 connected to the substrate 304. Specifically, in the illustrated example lid 302 is depicted as including carveout 306, carveout 308, carveout 310, carveout 312, carveout 314, carveout 316, carveout 318, and carveout 320. Each carveout 306, 308, 310, 312, 314, 316, 318, and 320 is configured as receding from an outer perimeter of the lid 302, denoted by edge 322, to create an indentation in the lid 302. In some implementations, one or more carveouts are dimensioned differently from other carveouts in the lid 302. For instance, in some implementations each carveout 306, 308, 310, 312, 314, 316, 318, and 320 is dimensioned as spanning a different length of an edge of the lid 302 and receding at a different depth towards an axis parallel to the edge of the lid 302 that intersects a center point of the lid 302.

In such implementations, each carveout 306, 308, 310, 312, 314, 316, 318, and 320 is configured to receive a protrusion of an auxiliary device (e.g., a light, a cooling device, etc.) having complementary dimensions, such that the auxiliary device is mechanically forced to align with the lid 302 in only a single possible orientation. Alternatively, in some implementations different carveouts have common dimensions with one another. For instance, in some implementations carveouts 306, 308, 314 and 316 have a first set of common dimensions (e.g., indentation width and depth) and carveouts 310, 310, 318, and 320 have a second set of common dimensions (e.g., indentation width and depth), such that an auxiliary device with corresponding protrusions is permitted to mechanically align with the processor 300 in one of two possible orientations. For a more detailed view depicting how a lid with carveouts is useable to mechanically aligns an auxiliary device with a processor's internal components, consider FIG. 4.

Figure 4:
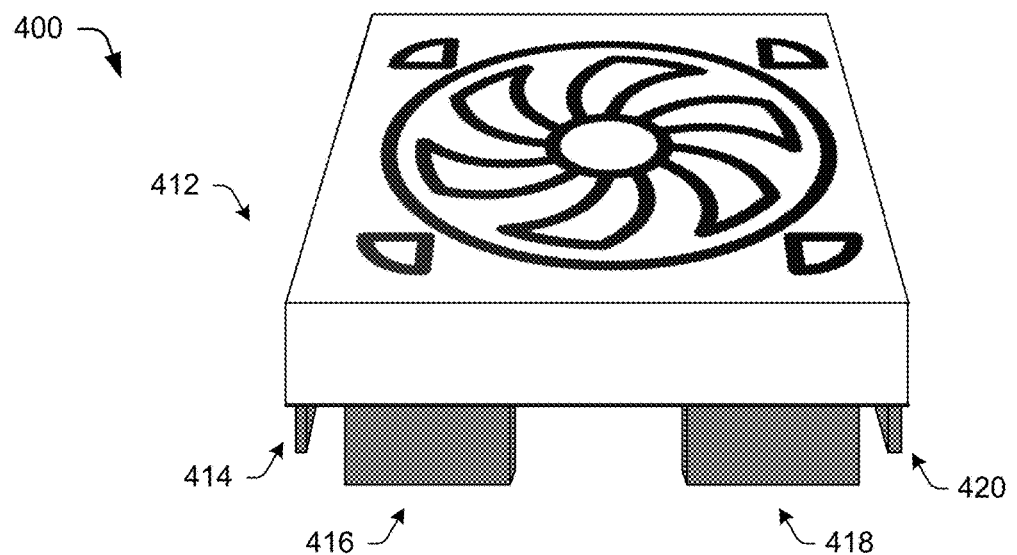
FIG. 4 illustrates an exploded view of an example device that includes a processor substrate, a processor lid with carveouts, and a processor cooling device.
Figure 4:
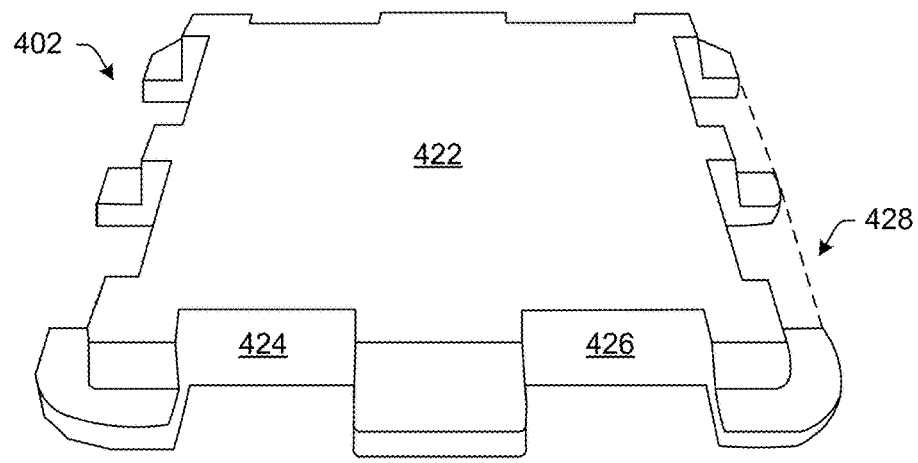
Figure 4:
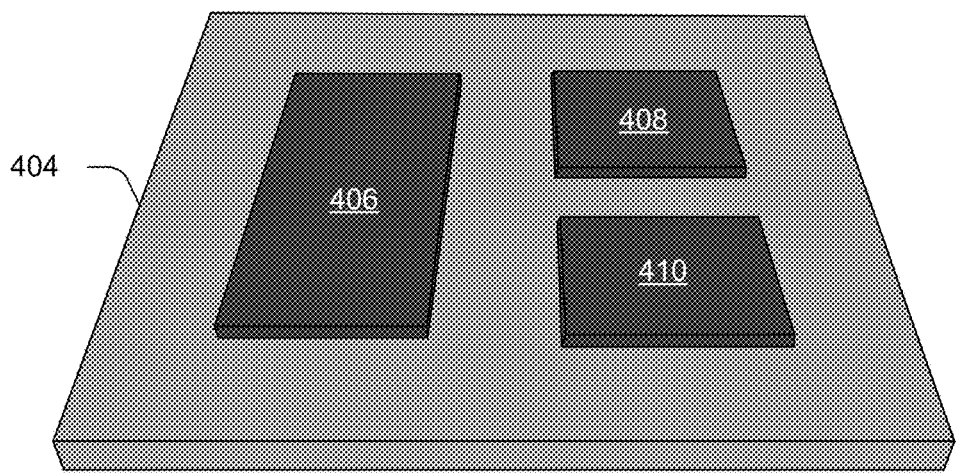

FIG. 4 illustrates an exploded view of an example device 400 that includes a processor lid 402 with carveouts and configured for attachment to a processor substrate 404. The processor substrate 404 is illustrated as including internal component 406, internal component 408, and internal component 410. In some implementations, internal component 406 is configured as an input/output die that includes one or more GPU components and is configured to communicate with memory locations leveraged by the processor. In some implementations, internal component 408 is representative of a hardware cache configured to store copies of data from frequently used memory locations. In some implementations, internal component 410 is representative of one or more processor cores, such as a CPU, a GPU, a parallel accelerated processor, a plurality of microprocessors, a DSP core, a controller, a microcontroller, ASICs, FPGAs circuits, any other type of IC, and/or a state machine.

The processor lid 402 is configured to protect and provide heat transfer for the internal components 406, 408, and 410. In addition, the processor lid 402 is configured to mechanically align an auxiliary device with the processor substrate 404 via carveouts included in the processor lid 402. For instance, the processor lid 402 is representative of an instance of the lid 302 with its carveouts 306, 308, 310, 312, 314, 316, 318, and 320. In the illustrated example, carveouts of the processor lid 402 are configured to mechanically align and secure an auxiliary cooling device 412 to the processor lid 402. One or more of the processor lid 402 carveouts are configured to mechanically align and secure the cooling device 412 to the processor lid 402 by receiving a corresponding one or more protrusions of the cooling device 412. For instance, in the illustrated example of FIG. 4, the exploded view of device 400 depicts four protrusions extending from the cooling device 412: protrusion 414, protrusion 416, protrusion 418, and protrusion 420.

In an example implementation where the processor lid 402 is configured as the lid 302 illustrated in FIG. 3, the protrusion 414 is configured to be mechanically aligned with and secured by carveout 308 when the cooling device 412 is coupled with the processor lid 402. Similarly, protrusion 416 is dimensioned as complementing carveout 310, protrusion 418 is dimensioned as complementing carveout 312, and protrusion 420 is dimensioned as complementing carveout 314. In this example implementation, the processor lid 402 carveouts and cooling device 412 protrusions are dimensioned such that the cooling device 412 is permitted to contact a heat transfer surface 422 of the processor lid 402 in a known alignment and orientation. The heat transfer surface 422 is representative of a surface of the processor lid 402 disposed opposite a surface of the processor lid 402 configured to contact the internal components 406, 408, and 410, thereby conducting heat from the internal components 406, 408, and 410 to a corresponding surface of the cooling device 412 that contacts the heat transfer surface 422.

To further improve heat transfer away from the internal components 406, 408, and 410, the carveouts increase a surface area of the processor lid 402 in contact with the cooling device 412. For instance, surface 424 is representative of a surface of carveout 310 that is approximately perpendicular to the heat transfer surface 422 that contacts a surface of the protrusion 416 when mechanically aligning and securing the cooling device 412 with the processor lid 402. In a similar manner, surface 426 is representative of a surface of carveout 312 that is approximately perpendicular to the heat transfer surface 422 that contacts a surface of the protrusion 418 when the cooling device 412 and processor lid 402 are mechanically aligned and secured with one another. The additional area of surface 424 and surface 426 contacting the respective protrusions 416 and 418 provide an additional means by which the processor lid 402 conducts heat from the internal components 406, 408, and 410 to the cooling device 412, thus enabling more efficient heat transfer relative to conventional lid designs.

As an additional advantage relative to conventional processor lids, because the carveouts recede from an outer perimeter of the processor lid 402, represented by the dashed line 428 in the illustrated example of FIG. 4, the processor lid 402 enables mechanical alignment and connection with the cooling device 412 even when a connected auxiliary device (e.g., the cooling device 412) has a smaller footprint than a footprint of the processor lid 402 or processor substrate 404. For instance, in contrast to the keep-out area required by conventional processor lid designs as illustrated in FIG. 2, the processor lid 402 provides secure and precise mechanical alignment with an auxiliary device independent of one or more attachment points of a circuit board to which the device 400 is attached, enabling implementation in more compact devices and reducing a requisite PCB size for accommodating the device 400.

Figure 5:
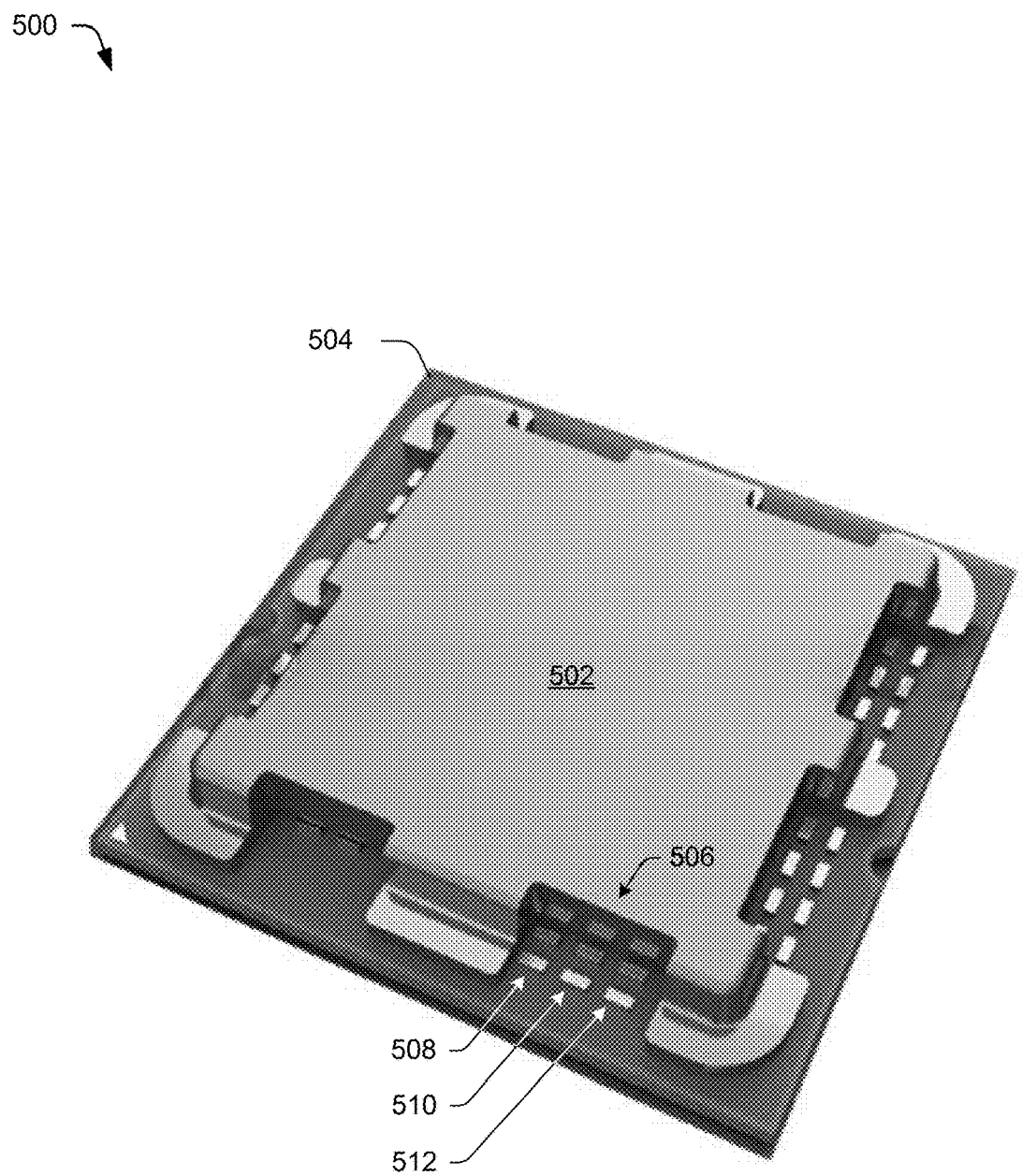
FIG. 5 illustrates an example of a processor with a lid including carveouts exposing connections of a processor substrate.

Another advantage offered by a processor lid including carveouts as described herein is the exposure of components disposed on a surface of a processor substrate protected by the processor lid. For instance, FIG. 5 illustrates an example of a processor 500 with a lid 502 including carveouts exposing components disposed on a processor substrate 504. In the illustrated example, lid 502 is depicted as including a plurality of carveouts, such as carveout 506. Carveout 506 proves an indentation recessed from an outer perimeter of the lid 502 that exposes component 508, component 510, and component 512, which would have otherwise been covered by the lid 502 absent the carveout 506. In some implementations, the component 508, component 510, and component 512 are each configured as a copper pad disposed on the processor substrate 504 and connected to an internal component of the processor 500, such as a CPU, via one or more pathways embedded in the processor substrate 504.

In such implementations where the components 508, 510, and 512 are configured as surface mount empty pads or other electrical connectors, the components are configured to establish an electrical connection between the internal component (e.g., CPU) of the processor 500 and an auxiliary device, such as a cooling device, an LED, and so forth. For instance, consider an implementation with respect to the previously described examples where the lid 502 represents an instance of lid 302, such that carveout 506 corresponds to carveout 312 and is configured to receive protrusion 418 of the cooling device 412. In the example implementation when configured as contacts, the components 508, 510 and 512 are configured to establish an electrical connection with corresponding electrical contacts disposed on a surface of the protrusion 418 that contacts the processor substrate 404 when mechanically aligned with the processor lid 402. Via the electrical connections enabled by components 508, 510, and 512, a high-speed data bus communicatively coupling the internal components of the processor 500 (e.g., one or more of the internal components 406, 408, or 410) and an auxiliary device is established. In this manner, carveouts of the lid 502 enable an internal component of the processor 500 to directly control an auxiliary device, such as one or more LEDs to visually output information describing a condition detected by the internal component of the processor.

In other implementations, the components 508, 510, and 512 are each representative of an LED or other light source integrated into the processor substrate 504 and communicatively coupled to one or more internal components of the processor 500. In such example implementations, the components 508, 510, and 512 are configured to visually output information describing a condition detected by the internal component of the processor via an area exposed by the carveout 506 that would have otherwise been visually occluded by conventional processor lid designs.

Figure 6:
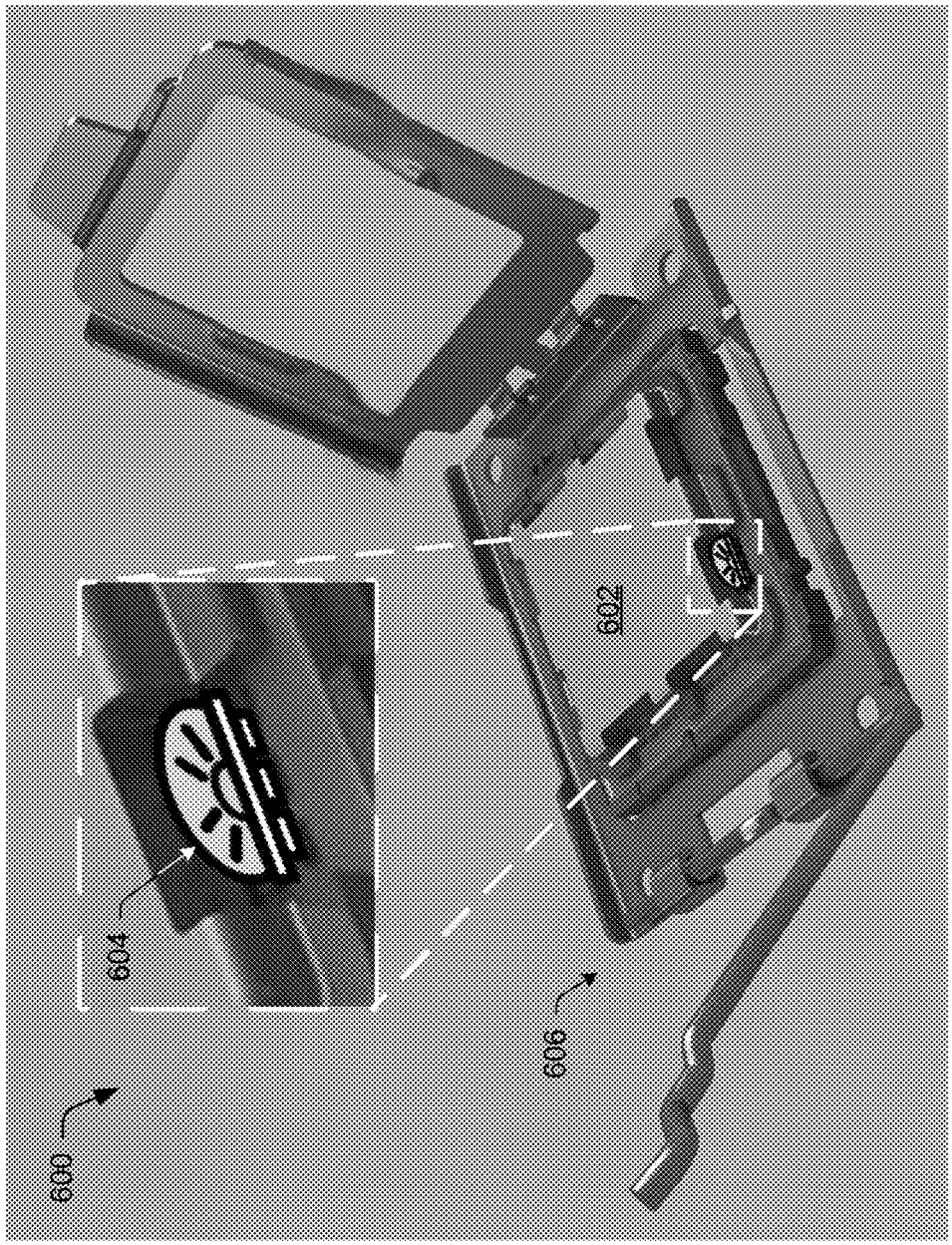
FIG. 6 illustrates an example of a processor with a lid including carveouts disposed in an open socket.
Figure 7:
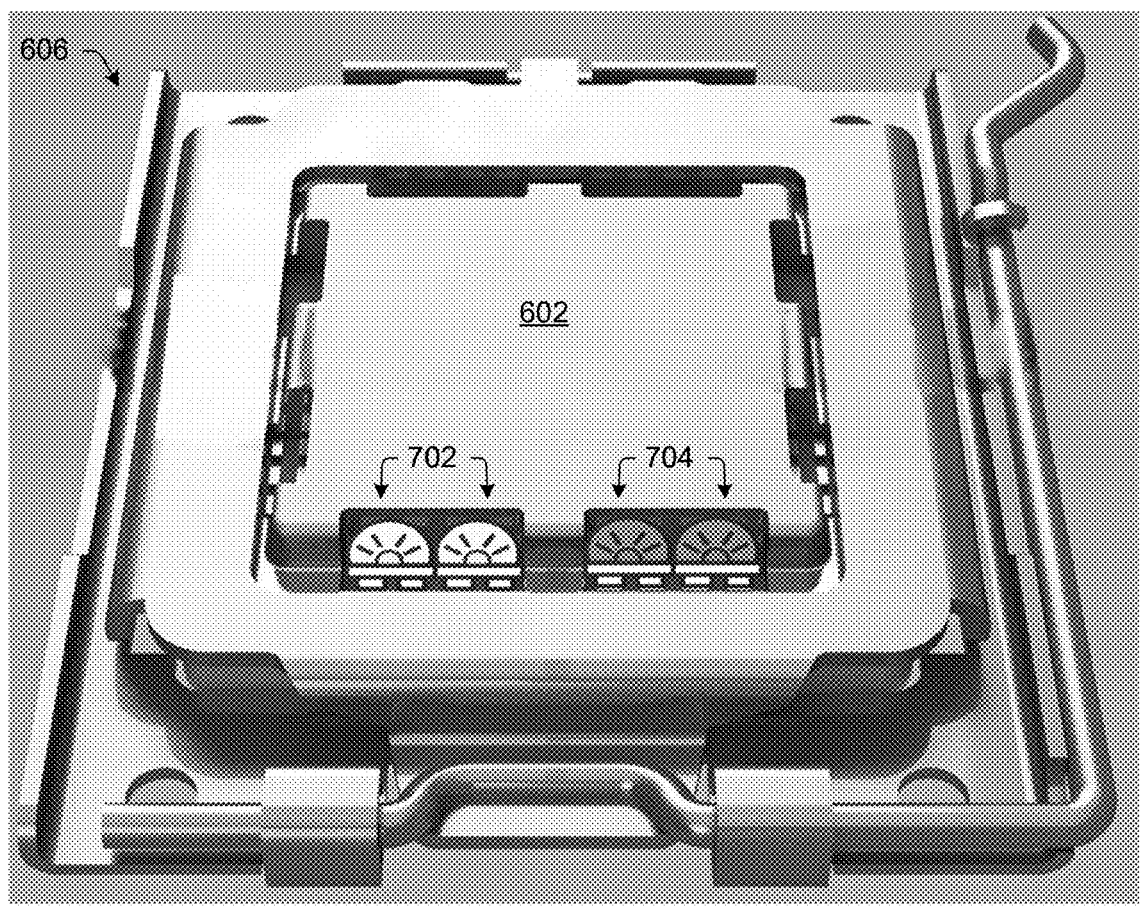
FIG. 7 illustrates an example of a processor with a lid including carveouts secured within a socket.

In implementations where the lid carveouts are configured to expose a light source integrated into a processor substrate or otherwise enable secure mechanical alignment of an auxiliary light source, the carveouts are configured to preserve visibility of light output when the processor is inserted into a socket connecting the processor to an external environment such as a printed circuit board. For instance, FIGS. 6 and 7 illustrate examples of a processor that includes a lid with carveouts configured to expose a processor-integrated or auxiliary light source connected to the processor when the processor is disposed in a processor socket. The illustrated example 600 of FIG. 6 depicts a processor 602 that includes a lid having carveouts configured to expose one or more components that are disposed on a processor substrate and configured for establishing a communicative coupling between internal components of the processor 602 and an auxiliary device. For instance, the illustrated example 600 depicts an implementation where a light 604 is disposed within one of the lid carveouts and communicatively coupled to an internal component of the processor 602 via one or more substrate connections exposed by a lid carveout. Alternatively, the illustrated example 600 depicts an implementation where the lid carveout exposes a light 604 integrated into a substrate of the processor 602, such as an LED integrated into a silicon substrate of the processor 602.

In the illustrated example 600 of FIG. 6, the processor 602 is depicted as interested into a processor socket 606 while the processor socket 606 is in an open position. In some implementations, the processor socket 606 is representative of a zero-insertion force (ZIF) socket configured to connect the processor 602 to an external environment and retain the processor 602 when the processor socket 606 is in a closed position. The illustrated example 700 of FIG. 7 depicts the processor socket 606 in a closed position retaining the processor 602. As visible from the illustrated example 700, while an external lid perimeter of the processor 602 is covered by a retention cover of the processor socket 606 in the closed position, the lid carveouts recede to a sufficient degree that exposes one or more lights integrated into the processor's 602 substrate, connected via contacts disposed on the processor's 602 substrate, or combinations thereof. For instance, the illustrated example 700 depicts an example implementation where the processor 602 is configured with a first light array 702 disposed in a first carveout and a second light array 704 disposed in a second carveout. The respective first and second carveouts are dimensioned such that the first light array 702 and second light array 704 remain visible while the processor 602 is secured within the closed processor socket 606.

Figure 8:
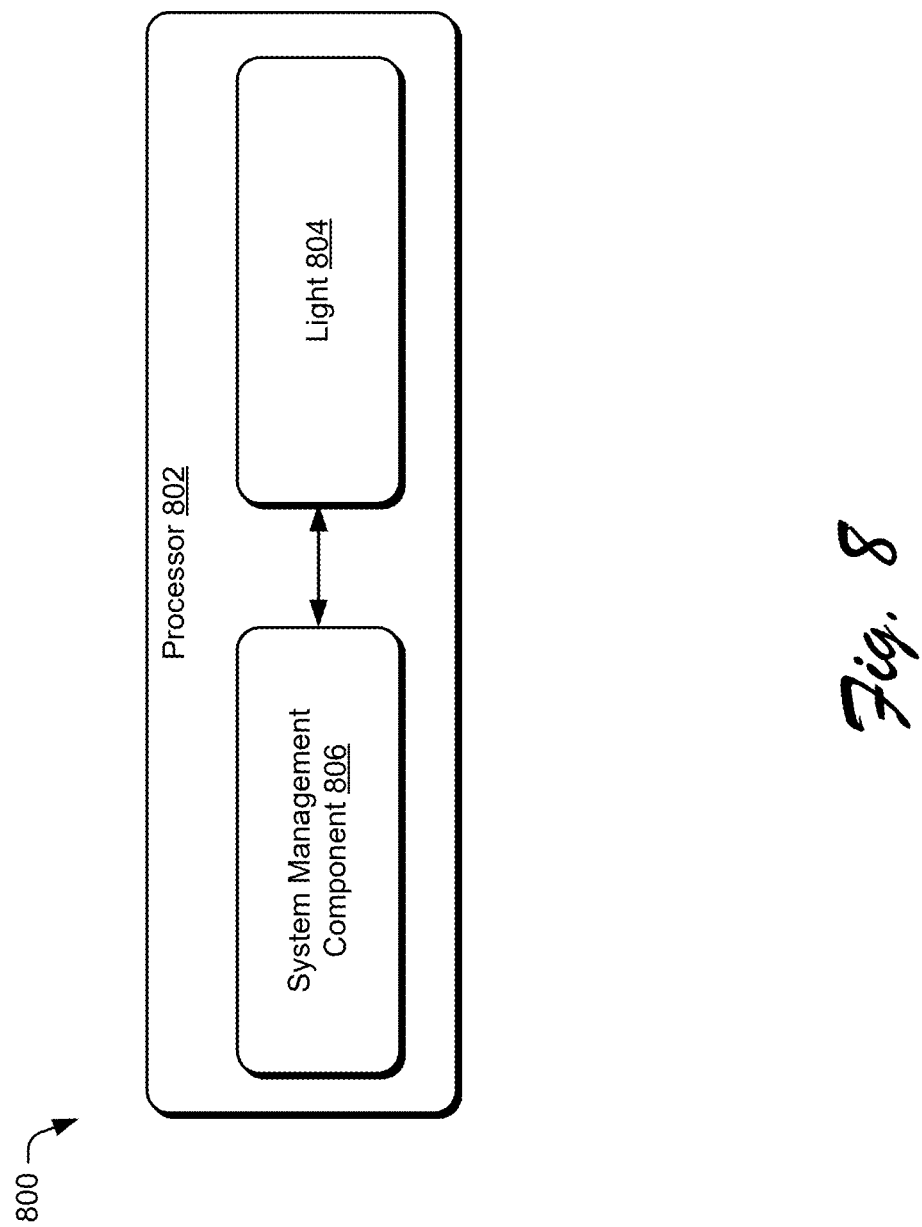
FIG. 8 is an illustration of a digital medium environment in which a processor directly communications with a light exposed by a lid carveout.

FIG. 8 is an illustration of a digital medium environment 800 in which a processor 802 includes a light 804 connected to the processor 802 and exposed by a processor lid carveout. In the illustrated example of FIG. 8, the processor 802 is depicted as including a system management component 806. The system management component 806 is representative of a functionality of the processor 802 to manage power consumption by one or more processor cores included in the processor 802. For instance, the system management component 806 is configured to control voltages supplied to various components of the processor 802, dictate what operations individual processor cores are performing at a given time, what frequencies are applied, and so forth. In this manner, the system management component 806 is configured to control and dynamically change an operating environment of the processor 802 based on a current or an upcoming task. Consequently, the system management component 806 is informed as to both current tasks being performed by discrete components of the processor 802 as well as upcoming tasks for performance by the discrete components. In conventional systems, the system management component 806 is configured to share information describing an internal component (e.g., a CPU) of the processor 802 by visually displaying the information in an operating system user interface or similar utility output via a display of a computing device implementing the processor 802.

However, such conventional implementations are dependent on a successful boot of the operating system and are unable to convey information from the system management component 806 in scenarios where the operating system fails to boot. In contrast to these conventional shortcomings, the lid carveouts described herein visually expose the light 804 to the human eye of a user observing the processor and communicatively couple the light 804 to the system management component 806. In this manner, the lid carveouts enable the system management component 806 to visually convey information directly at the processor 802 without reliance on a successful operating system boot at a computing device implementing the processor 802.

In some implementations, the visual information output by the light is specified by a manufacturer of the processor 802. Alternatively or additionally, the visual information output by the light is specified via user input from a user of the computing device implementing the processor 802. For instance, in some implementations the system management component 806 enables a user to specify a specific color, flash pattern, or combination thereof to be output by the light 804 when the system management component 806 detects occurrence of a specified condition at the processor 802. As an example, the light 804 is configured to emit a first combination of colors and/or flash patterns to indicate different temperatures of the processor 802 or internal components of the processor as detected by the system management component 806. Continuing this example, the light 804 is configured to emit a second combination of colors and/or flash patterns to indicate different power consumption by the processor 802 or internal components of the processor 802 as detected by the system management component 806. The light 804 is configured to emit a third combination of colors and/or flash patterns to indicate different communication speeds between the processor 802 and one or more computing device components coupled to the processor (e.g., memory modules), and so forth, for any range of different conditions detected by the system management component.

As further examples, the system management component 806 is configured to cause the light 804 to output a visual indication of various issues encountered by internal components of the processor 802 during boot (e.g., whether memory modules are properly connected, whether a connected PCIe device is compatible, and so forth). In this manner, the light 804 exposed by one or more lid carveouts enables visual communication of information detected by internal components of the processor 802 that are otherwise unavailable for communication to a user of a computing device implementing the processor 802 or otherwise undetectable by other components of the computing device.

The following discussion describes techniques that are implemented utilizing the previously described systems and devices. Aspects of the procedure are implemented in hardware, firmware, software, or a combination thereof. The procedure is shown as a set of blocks that specify operations performed by one or more devices and are not necessarily limited to the orders shown for performing the operations by the respective blocks. Furthermore, although various operations performed by one or more devices are recited, the techniques discussed herein additionally or alternatively include additional operations. In portions of the following discussion, reference is made to FIGS. 3-8.

Figure 9:
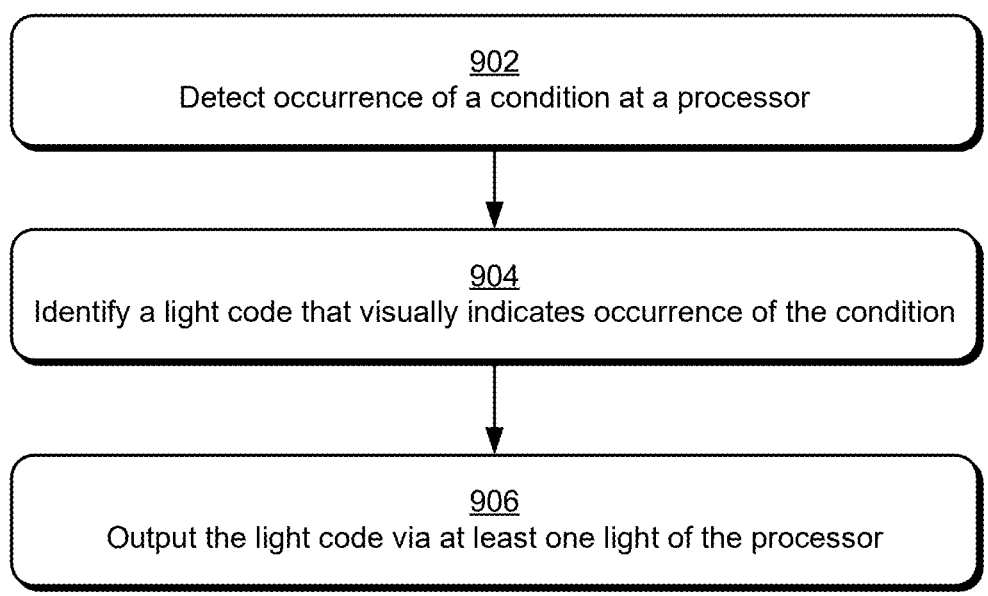
FIG. 9 is a flow diagram depicting a procedure in an example implementation of a processor directly communicating with a light connected to the processor via a lid carveout.

FIG. 9 is a flow diagram 900 depicting a procedure in an example implementation of a processor directly communicating with a light connected to the processor via a lid carveout. In some implementations, operations of the flow diagram 900 are performed by an internal component of a processor, such as the system management component 806 of processor 802.

In the procedure of FIG. 9, occurrence of a condition is detected at a processor (block 902). The system management component 806, for instance, detects that a state of an internal component of the processor 802 satisfies a predefined condition for the internal component. Examples of predefined conditions include satisfying a temperature threshold, satisfying a power consumption threshold, satisfying a communication bandwidth threshold, proper connection of a component (e.g., memory module, PCIe device, etc.) to the processor 802, and so forth.

Alternatively or additionally, the system management component 806 detects whether the processor 802 is properly communicatively coupled to one or more computing device components (e.g., whether DIMMS are plugged into correct sockets, whether connections between the processor 802 and components of a PCB on which the processor 802 is installed are loose or otherwise improper, whether PCIe devices are properly connected, and so forth). Alternatively or additionally, the system management component 806 detects whether a system BIOS is incompatible with a version of the processor 802. Alternatively or additionally, the system management component 806 detects whether fail conditions existed during a prior boot of the processor 802 (e.g., internal CPU error, hang, condition causing a hard lock, and so forth).

Alternatively or additionally, when the procedure of FIG. 9 is performed during a debugging implementation, the system management component 806 detects one or more conditions resulting from the processor 802 executing a set of instructions (e.g., completed execution of a certain set of instructions, throttling performed during execution, clock stretch activity during execution, and so forth).

In response to detecting occurrence of the condition, a light code is identified that visually indicates the occurrence of the condition (block 904) and the light code is output via at least one light of the processor (block 906). As described herein, the light code for a condition refers to any one or more colors, flashing patterns, or combinations thereof, output by the light 804 to indicate occurrence of the condition. For instance, in an example implementation the system management component 806 identifies that a solid blue light corresponds to a first temperature threshold and causes the light 804 to display a solid blue color in response to detecting satisfaction of the first temperature threshold. Continuing this example, the system management component 806 identifies that a yellow light corresponds to a second temperature threshold and causes the light 804 to display a yellow color in response to detecting satisfaction of the second temperature threshold. The system management component 806 then identifies that a flashing red light corresponds to a third temperature threshold and causes the light 804 to display a flashing red color in response to detecting satisfaction of the third temperature threshold.

In this manner, each condition detected by the system management component 806 is associated with a visual indication, such that occurrence of the condition triggers output of the visual indication via the light 804. In some implementations, the visual indication for a condition is pre-specified by a manufacturer of the processor 802. Alternatively or additionally, the visual indication for a condition is specified by a user of a computing device implementing the processor 802. Consequently, the systems and techniques described herein enable customized communication of specific conditions for a processor 802 via lights that are directly coupled to a system management component 806 of the processor 802.

Although features and elements are described above in particular combinations, each feature or element is usable alone without the other features and elements or in various combinations with or without other features and elements. In this manner, many variations are possible based on the disclosure herein.

The various functional units illustrated in the figures and/or described herein are implemented in any of a variety of different manners such as hardware circuitry, software executing or firmware executing on a programmable processor, or any combination of two or more of hardware, software, and firmware. The methods provided are implemented in any of a variety of devices, such as a general-purpose computer, a processor, or a processor core. Suitable processors include, by way of example, a general-purpose processor, a special purpose processor, a conventional processor, a CPU, a GPU, a parallel accelerated processor, a plurality of microprocessors, one or more microprocessors in association with a DSP core, a controller, a microcontroller, ASICs, FPGAs circuits, any other type of IC, and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A processing device comprising:
a substrate including at least one processor core and one or more lights connected via an electrical connection to the at least one processor core; and
an integrated heat spreader that is bonded to the substrate and covers the at least one processor core, the integrated heat spreader including a plurality of carveouts that expose at least one of the one or more lights, each of the plurality of carveouts being disposed along an edge of the integrated heat spreader and receding from an outer perimeter of the integrated heat spreader.

2. The processing device of claim 1, wherein the at least one processor core comprises one or more of a central processing unit, a graphics processing unit, or a parallel accelerated processor.

3. The processing device of claim 1, wherein the at least one processor core comprises a system management component configured to manage power consumption by the at least one processor core and output a visual indication regarding the power consumption via the one or more lights.

4. The processing device of claim 1, wherein the at least one processor core comprises a system management component configured to monitor a temperature of the at least one processor core and output a visual indication regarding the temperature via the one or more lights.

5. The processing device of claim 1, wherein the at least one processor core comprises a system management component configured to monitor whether one or more memory modules are properly connected to the at least one processor core and output a visual indication regarding whether the one or more memory modules are properly connected via the one or more lights.

6. The processing device of claim 1, wherein the at least one processor core comprises a system management component configured to determine a compatibility of a peripheral component interconnect express device connected to the processing device and output a visual indication regarding the compatibility via the one or more lights.

7. The processing device of claim 1, wherein the at least one processor core comprises a plurality of processor cores and the one or more lights comprises a plurality of lights that each correspond to one of the plurality of processor cores, wherein at least one of the plurality of processor cores comprises a system management component configured to visually indicate a status of the plurality of processor cores using the plurality of lights during operation of the processing device.

8. The processing device of claim 1, wherein the plurality of carveouts are configured to enable a press fit connection between a cooling device and the integrated heat spreader and maintain visibility of the one or more lights when the cooling device is connected to the integrated heat spreader.

9. The processing device of claim 1, wherein the integrated heat spreader comprises a first surface configured to contact the at least one processor core and a second surface that is disposed opposite the first surface and configured for transferring heat away from the at least one processor core by contacting a cooling device.

10. The processing device of claim 9, wherein at least one of the plurality of carveouts includes an additional surface oriented approximately perpendicular to the first surface and the second surface, the additional surface being configured to mechanically align the integrated heat spreader with a protrusion of a cooling device and transfer heat to the protrusion of the cooling device.

11. The processing device of claim 1, wherein the at least one processor core is configured to detect upcoming execution of an operation and, prior to execution of the operation, visually indicate upcoming execution of the operation via the one or more lights.

12. A system comprising:
a processing device including:
  a substrate with at least one processor core and one or more contacts;
  an integrated heat spreader that is bonded to the substrate and covers the at least one processor core, the integrated heat spreader including a plurality of carveouts that expose the one or more contacts; and
  a light connected to the one or more contacts and disposed within one of the plurality of carveouts; and
a cooling device including a plurality of protrusions that mechanically align the cooling device with the processing device using a subset of the plurality of carveouts.

13. The system of claim 12, wherein the subset of the plurality of carveouts excludes the one of the plurality of carveouts in which the light is disposed.

14. The system of claim 12, wherein the system is disposed in a computing device and an output of the light is visible to a human eye observing the computing device.

15. A processing device comprising:
a substrate including at least one processor core and one or more lights connected via an electrical connection to the at least one processor core; and
a lid that covers the at least one processor core and includes a plurality of carveouts that expose at least one of the one or more lights, each of the plurality of carveouts being disposed along an edge of the lid and receding from an outer perimeter of the lid.

16. The processing device of claim 15, wherein the lid is bonded to the at least one processor core.

17. The processing device of claim 15, wherein the at least one of the one or more lights outputs a light code in response to the at least one processor core satisfying a temperature threshold.

18. The processing device of claim 15, wherein the at least one of the one or more lights outputs a light code in response to the at least one processor core satisfying a power consumption threshold.

19. The processing device of claim 15, wherein the at least one of the one or more lights outputs a light code indicating an improper connection between the at least one processor core and a memory.

20. The processing device of claim 15, wherein the at least one of the one or more lights outputs a light code indicating that an incompatible device is connected to the at least one processor core via a peripheral component interconnect express connection.

* * * * *